Nov. 26, 1940. J. HELLE ET AL 2,222,664
APPARATUS FOR THE REMOVAL OF LIQUIDS FROM MASSES
OF MATERIAL ASSOCIATED THEREWITH
Original Filed Nov. 10, 1936 4 Sheets-Sheet 2

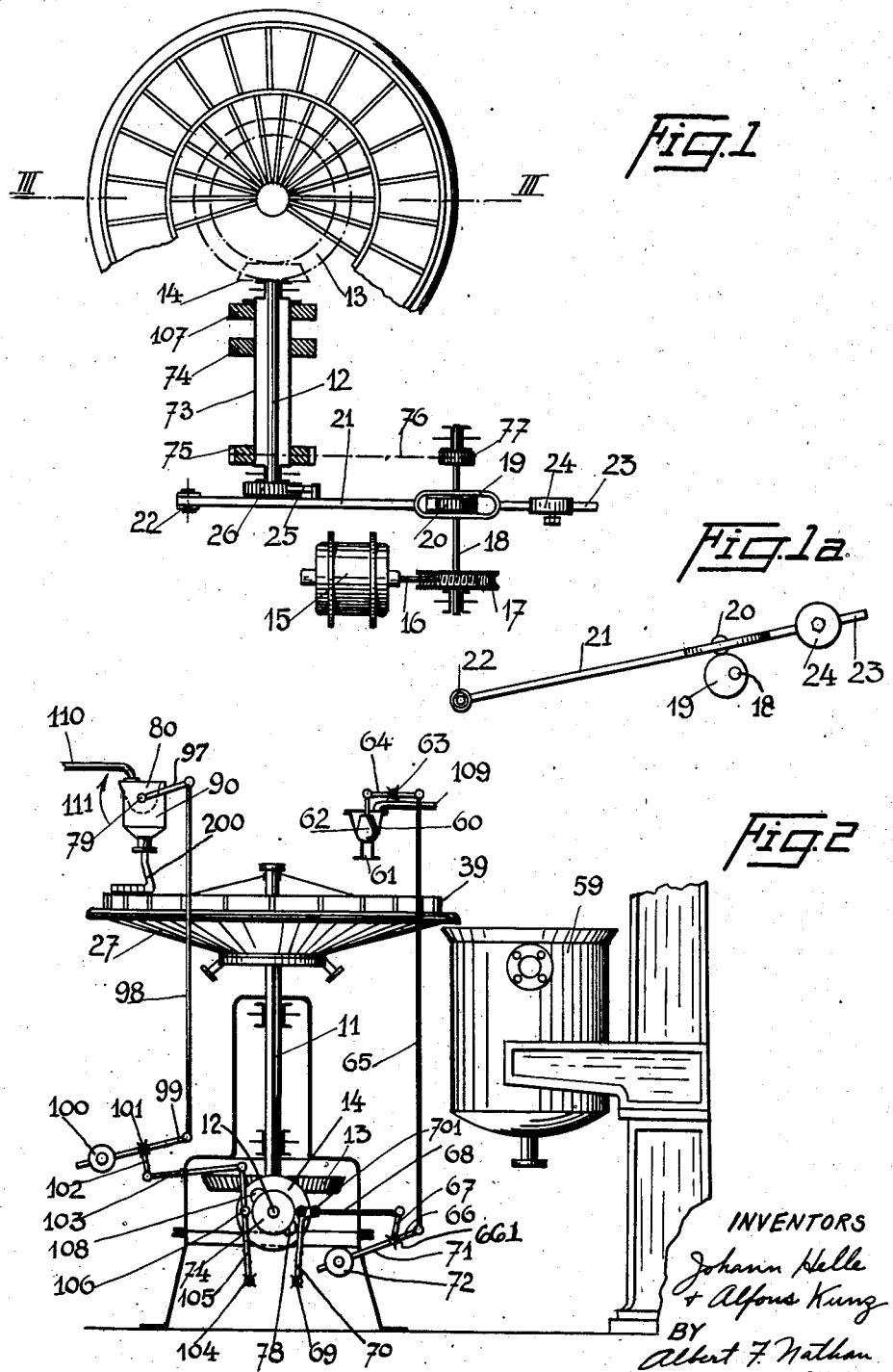

INVENTORS
Johann Helle
+ Alfons Kunz
BY Albert F. Nathan
ATTORNEY

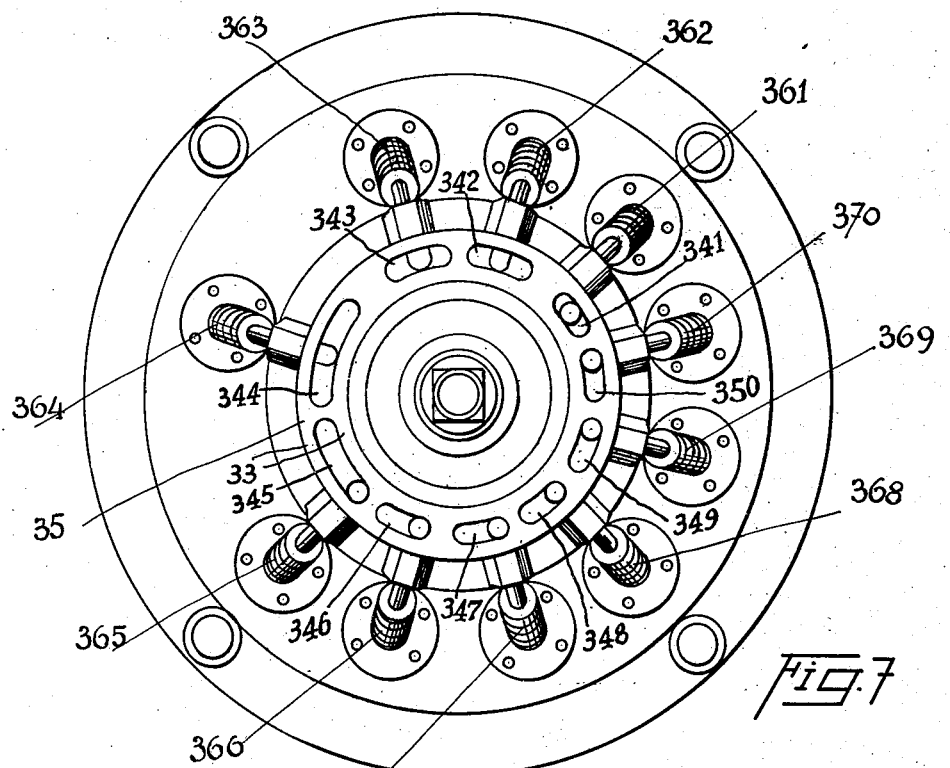
Fig. 7
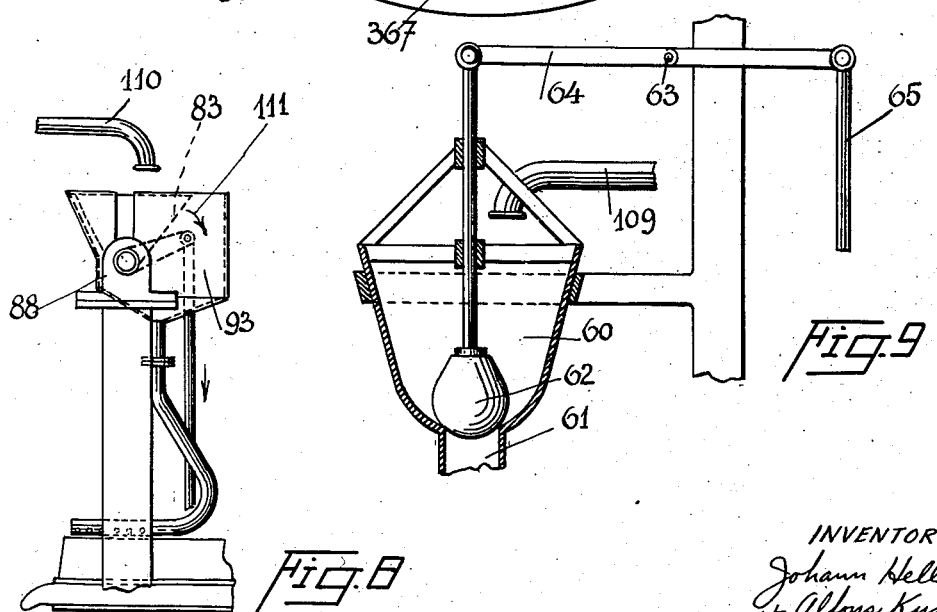
Fig. 8
Fig. 9

Patented Nov. 26, 1940

2,222,664

UNITED STATES PATENT OFFICE 2,222,664

APPARATUS FOR THE REMOVAL OF LIQUIDS FROM MASSES OF MATERIAL ASSOCIATED THEREWITH

Johann Helle and Alfons Kunz, Fuzfo, Hungary, assignors to Nitrokemia Ipartelepek Reszvenytarsasag, Budapest, Hungary, a Hungarian company Original application November 10, 1936, Serial No. 110,187. Divided and this application June 24, 1938, Serial No. 215,590. In Hungary May 22, 1936

14 Claims. (Cl. 210—196)

The present invention relates to apparatus for the removal of liquids from masses of material associated therewith, e. g., the removal of acid from nitrated starch, and this application is a division of our co-pending application Serial No. 110,187, which was filed upon the 10th November, 1936.

One object of this invention is to provide apparatus which can be used for carrying into effect the process for the removal of acid from nitrated starch as described and claimed in the said co-pending application.

Another object of the invention is to provide apparatus of the kind described which can be operated uninterruptedly to deal with a continuity of batches of material upon a continuous belt system.

Another object of the invention is to provide apparatus whereby individual batches of material, such as nitrated starch, can be processed step by step while a continuous series of such batches are applied to and removed from the apparatus.

Yet another object is to provide apparatus in which nitrated starch is arranged in separate batches in a series, and these batches are treated in counter current with water and freed from the mixed acid.

A further object is to provide apparatus in which the separate masses of nitrated starch identical one with the other are spread in layers of substantially the same thickness on filter stones arranged separately one from the other in a common carrier, and washed out with water in such a manner that the pure water is conducted to the mass already repeatedly extracted and containing the least amount of mixed acid and the acidified water obtained at this point is successively conducted to nitro starch masses containing more and more mixed acid, while the aqueous acid drawn from the last mass of the series is removed and can be used as concentrated acid, for example, in nitrating fresh starch.

One form of apparatus constructed according to the invention will now be explained by way of example and with reference to the accompanying drawings, in which:

Fig. 1 is a plan view of the apparatus broken away particularly to show the driving means.

Fig. 1a is an elevational view of a detail of the mechanism shown in Fig. 1.

Fig. 2 is an elevational view of the apparatus.

Fig. 7 shows a plan view of part of the apparatus.

Fig. 8 shows the acid delivery to the separate cells.

Fig. 9 shows the arrangement for conducting the nitrated starch to the apparatus.

Corresponding parts in the drawings are indicated by similar reference numerals.

Figure 4:
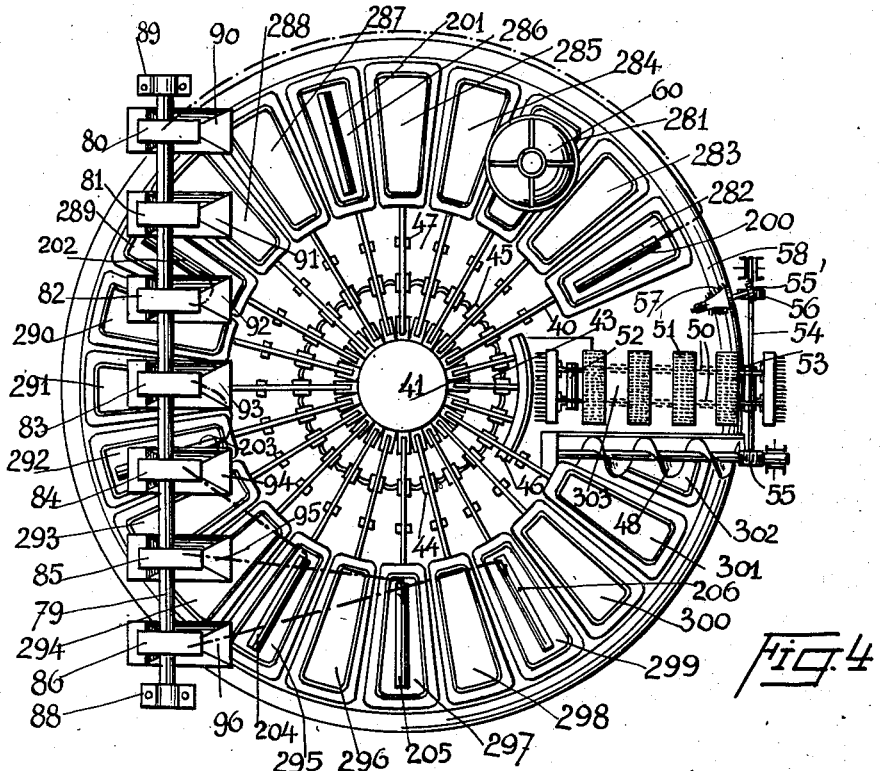
Fig. 4 is a plan view of the apparatus.

The perpendicularly disposed shaft 11 is driven by the shaft 12 by means of the bevel gearing 13 and 14. The shaft 12 rotates intermittently and is operated in this manner by the electric motor 15 through the co-operating drive shown in Fig. 1. The motor 15 drives the shaft 18 by means of the spindle 16 and worm gear 17. An eccentric 19 is keyed on to the shaft 18 and supports the rod 21 by means of the roller 20. The rod 21 is rotatably mounted on the pivot 22 and is loaded with the weight 24 at its free end.

The rod 21 carries a co-operating pawl 25 which engages in the teeth of the cog 26 and turns the shaft 12 through an angular distance equal to the pitch of the said teeth with each rotation of the eccentric.

At the upper end of the shaft 11 an attachment 27 is firmly keyed thereto so that this part 27 moves with the shaft 11. The attachment made, for example of acid resisting steel, carries on its upper surface a series of segment shaped openings arranged in a circle one beside the other into which openings filter stones 281—303 are fitted to make a close fit. Under the filter stones 281—303 hollow spaces 29 are provided in the interior of the attachment each of which hollow spaces opens into a drain channel 30 also in the interior of the attachment. The lower openings 31 of all these channels lie on a horizontally arranged annular sliding surface 32 of the attachment on which the attachment slides on an edge 33 also forming a sliding surface of a circular shaped member 35. Slots 341—350 are cut along the entire sliding surface 35 which slots are of different lengths for a purpose which will be hereinafter made clear. These slots 341—350 open into flexible tubes 361—370 through which the contents of the channel 30 and the hollow spaces 29 may be conducted away. The circular member 35 is firmly pressed against the sliding surface 32 of the attachment by means of a number of springs 37 so that the wearing of the sliding surfaces can cause no leakage between the contacting surfaces. The lower ends of the springs 37 abut on the fixed housing 38 of the shaft 11.

A frame 39 having four pyramidal sides lies on each of the filter stones 281—303. This pyramidal form serves the purpose of preventing the filter cake being carried up with the frame when the latter is raised.

Each frame 39 is attached to an arm 40, all the arms 40 turning on a ring of pivots 41. A ring 42 is fixed on the attachment between the frames 39 and the pivots 41, and the upper edge 43 of the ring is slanted outwardly and provided with a swallow tail groove 44 for each of the arms 40.

These grooves form guides for the arms 40 in order to prevent side displacement by bending at the pivots 41, when the arms 40 are raised above or lowered to the filter stone.

The rollers 45 are arranged on the arms 40 to guide the latter on to the edge of the grooves 44.

Figure 3:
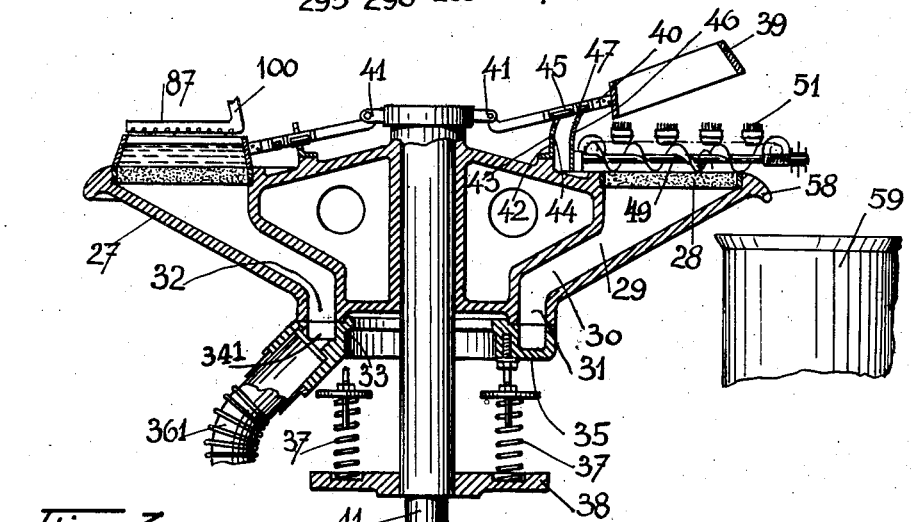
Fig. 3 is a longitudinal section on the line III—III of Fig. 1.
Figure 5:
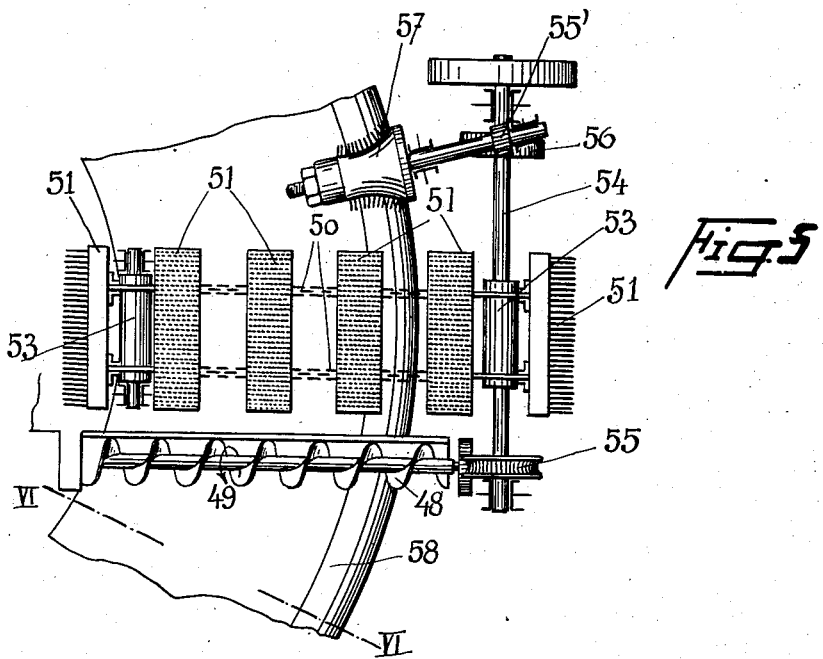
Fig. 5 shows on an enlarged scale the purification arrangement of the apparatus.
Figure 6:
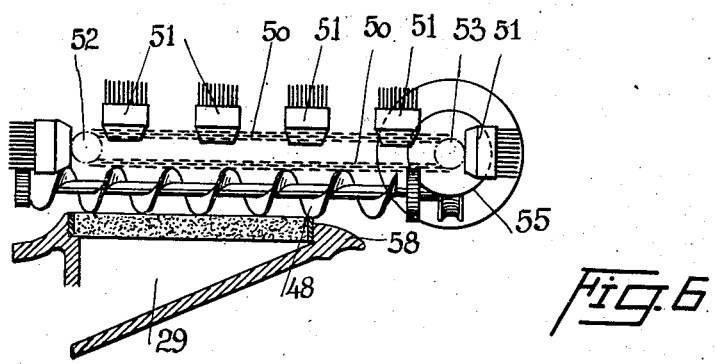
Fig. 6 shows a section on the line VI—VI of Fig. 5.

An arcuate rib 46 is arranged as a fixed rail on a part of the circular path and the height of this rib which does not rotate with the attachment, increases progressively from one end until the height shown in Fig. 3 is reached for the purpose of raising the arm 40 at a determined position of its path from the filter stone to which it belongs, and then lowering it again to the same filter stone.

Rollers 47 are provided on the arm 40 to guide it along the rail 46.

At that part of the circular path at which the frames 39 are fully raised there are provided three cleaning devices namely the screw conveyor 48 which, rotating in the direction of the arrow 49, cleans the filter stone and removes the adherent material from the stone over the edge 58 of the attachment into a container 59. After the screw conveyor there follows a series of brushes 51 fixed on an endless chain 50. The chains move over rollers 52, 53, of which 52 revolves loosely and 53 is fixed on to the shaft 54. The shaft 54 drives the screw conveyor 48 through a worm gear 55, and also drives through helical screw gear 55', 56, the conical brush 57 which cleans the downwardly bent edge 58 of the attachment. All three cleaning devices move the material into the container 59.

The material to be treated is conducted from the container 60 to the separate cells formed by each filter stone and frame.

The container 60 is in the form of a funnel, and its lower wide opening 61 is closed by a ball valve 62. The valve 62 is connected with one end of the lever 64 movable about the fixed pivot 63, and is operated by means of the draw rod 65.

For this purpose the draw rod 65 is connected with the arm 66 of an integral triple lever movable about the fixed pivot 661 and the second arm 67 of said lever through the rod 68, is in hinged connection with the lever 70 which is movable about the fixed pivot 69.

The lever 70 carries at its free end a roller 701. The weight 72 fixed on to the third arm 71 of the triple lever presses by means of the rod 65 and the lever 64 the valve 62 into its seating, and on the other hand by means of the lever 67 and the rod 68 the roller 701 against the cam disc 74 arranged on the hollow shaft 73. The hollow shaft 73 coaxial with the shaft 12 is driven by the shaft 18 of the worm drive 17 and the chain 76 and chain wheels 75 and 77.

These transmissions are so selected that the hollow shaft 73 and the cam disc 74 arranged thereon together with abutment 78 makes one revolution whilst the pawl 25 turns the shafts 12 and 11 through a part of a rotation corresponding to the pitch of the teeth.

The number of teeth of the wheel 26 is the same as the number of filter stones to the attachment 27, so that with each rotation of the eccentric 19 the attachment 27 is rotated through an angular distance equivalent to the pitch of the stones and then remains stationary for a certain time. The abutment 78 is so arranged that it operates the rods 65 and 64 of the valve 62, that is to say, opens and closes the valve 62 during the time that the attachment 27 stands still.

The form of apparatus shown in the drawings is adapted for washing nitrated starch. The acids employed for this purpose of different concentration are conducted to the containers 80—86 arranged on the horizontal axle 79. The containers are of triangular longitudinal section (see Fig. 8) and the common axle 79 is passed through the lowest corner. Each container lies inside one of the fixed containers 90—96, and each of these containers opens at its lowest point into one of the pipes 200—206. Each of the tubes has a straight extended end provided with holes 87, and directed radially to the shaft 11, so that when the attachment stands still it is positioned in the middle of one of the frames 39.

The axle 79 is mounted in bearings 88 and 89 and is connected by lever 97 and rod 98 with an integral triple lever 99, loaded at its other end by the weight 100. The triple lever is movable about the fixed axle 101, and its third arm 102 is connected with the lever 105 movable about the fixed axle 104 by means of the rod 103. The lever 105 is provided with a roller 106 which rolls on the periphery of the cam 74, and is operated by the abutment 108.

In washing nitrated starch the apparatus is operated as follows:

A reduced pressure is set up in the conduits 361—370 each of which opens into a special collecting vessel, not shown in the drawings. The pulp like nitrated starch is conducted to the container 60 in amounts determined beforehand. The container 80 is filled with concentrated sulphuric acid, containers 81—83 with nitric-sulphuric acid solutions of progressively lower concentration and the containers 84, 85 and 86 with water. The filling of the containers is effected each time before the attachment and members carried thereon are further rotated through an angular distance equivalent to the pitch of the filter stones and the frames 39. Conveniently conduits 110 are provided for feeding the several containers in batches.

First of all the valve 62 is opened by the projection 78, by the operation of the rods 67, 66, 65 and 64. As the lower opening 61 of the container 60 is very wide, its empties itself suddenly and its contents are poured over the filter stone 281 standing under the container 60. The pulp like mass suddenly poured on the stone distributes itself on the stone in the frame standing above it in a layer of uniform thickness.

Simultaneously the projection 108 operates the rods 103, 102, 99, 98, 97 and turns the axle 79 in the direction of the arrow 111 so that the contents of all the containers 80—86 are poured respectively into the funnels 90—96, and through the tubes 200—206 to trickle between each two movements through their fine bore holes 87 on to the filtered nitrated starch cakes standing under the tube ends. The acid or water so conducted to the layers of nitro starch forms thereon layers of liquid of the same depth above each.

Concentrated sulphuric acid flows from the container 80 on to the empty stone 282, and is drawn therethrough by the vacuum under the stone. The object of this operation is to free the stone 282 from the water it contains. This acid is sucked off while the stone is in the position immediately following, that is to say, where in the drawing (Fig. 4) the stone 283 is standing. The drain channel 30 under the filter stone 282 communicates through the slot 350 of the circular body 35 with the flexible conduit 370, while the drain channel of the filter stone 283 communicates through slot 341 with the flexible conduit 361. The acid here drawn off is regenerated.

The fresh mass of nitrated starch falling from the container 60 comes to the stone 281. It contains still a considerable amount of acid, which is drawn off by the vacuum under the stone, partly in this position, and partly in the two positions immediately following this suction. Filtration of the starch occurs simultaneously on stones 284 and 285. The channels 30 under the stones 281, 284, and 285 open in the position of the attachment shown in the drawing through slot 342 of the annular body 35 into the flexible conduit 362 corresponding to this slot. The concentrated acid here drawn off is regenerated and used for nitrating fresh starch.

The acid from the container 81 is poured on to the nitrated starch lying on stone 286. This acid has been drawn from the material on stones 289, 290 and 291. The suction filtering is effected in the three succeeding positions 286, 287 and 288 through the slot 343 and the tube 363. The acid drawn off here is regenerated and used for nitrating fresh starch.

The more dilute acid from container 82 which has been drawn from the material lying on stones 292, 293 and 294 is conducted to the material on stone 289. The channel 30 corresponding to stones 289, 290 and 291 opens through the common slot 344 into the flexible tube 364. The acid drawn off here goes to stone 286 through the container 81. The aqueous acid from container 83 which is drawn from the material on stones 296—298 is conducted to filter stone 292. Suction filtration goes on in the three succeeding positions 292, 293 and 294 and the liquid is conducted through the slot 345 of the annulus 35 common to these positions, and through the flexible tube 365 and the container 82 to the stone 289.

Pure water flows from the container 84 on to the material on stone 295. Suction filtration goes on in both succeeding positions 295 and 296, and the liquid drawn off goes through the slot 346 into the flexible tubing 366. It is then conducted to container 83 from where it goes to the stone 292.

In the same way pure water flows from the container 85 on to the material on filter stone 297. Suction filtration goes on in the two succeeding positions 297 and 298 through the slot 347 and tube 367 and the liquid drawn off is conducted to the container 83.

The material on stone 299 receives pure water from container 86 which is drawn off in positions 299 and 300 through the slot 348 and the tube 368.

From the position 300 onwards the frames 39 are raised by the rib 46 so that the material can be removed by the conveyor devices 48 and 51. These conveyor devices remove the material freed from acid to the container 59 and simultaneously the edge of the attachment is cleaned by the brush 57.

The above description is given as if the apparatus were at rest, but as it is moving step by step this order of procedure is repeated at each movement forward of the attachment so that continually a stone is covered with fresh nitrated starch, and with the exception of these standing under the cleaning devices, acid of the described different concentrations or water is conducted to the remainder.

The apparatus according to the invention can be used apart from the removal of acid from nitrated starch for similar operations in which the material to be treated must be freed from a liquid.

What we claim is:

1. Apparatus for the removal of liquids from masses of material associated therewith, which comprises a carrier having a slidably movable plane surface with slots therein, a series of box filters mounted on said carrier above said slots to receive the masses of material, each of said filters comprising a horizontal filter surface upon which a mass of material is deposited, a box-like frame normally resting on said horizontal filter surface and a chamber below said filter surface to collect liquid passing through said filter, said chamber having outlets communicating with said slots in said carrier surface, a member having a fixed plane surface with slots which coincide at regular intervals with the slots in said carrier surface, a series of conduits communicating with said slots in a fixed plane surface, mechanism for moving said plane surface of said carrier slidably in contact with said fixed plane surface of said member at intermittent intervals, whereby said slots in the said contacting surfaces are brought into coincidence at determined intervals, and means for raising said frames from said filter surface when said masses of material are to be removed from said filter surfaces.

2. Apparatus as claimed in claim 1, including a fixed hopper for the material, and a plurality of fixed liquid conduits so arranged that when the filter carrier is at rest, material to be treated and wash liquors can be delivered to co-operating filters.

3. Apparatus for the removal of liquids from masses of material associated therewith which comprises a carrier having a slidably movable surface with slots therein, a series of box filters mounted on said carrier above said slots to receive the masses of material, each of said filters comprising a horizontal filter surface upon which a mass of material is deposited, a pivoted arm, a frame carried by said arm and normally resting on a horizontal filter surface, and a chamber below said filter surface to collect liquid passing through said filter, said chamber having outlets communicating with said slots in said carrier surface, a member having a fixed plane surface with slots which coincide at regular intervals with said slots in said carrier surface, a series of conduits communicating with said slots in said fixed plane surface, mechanism for moving said carrier surface slidably in contact with said fixed plane surface at intermittent intervals, whereby the slots in said plane surfaces may be brought into coincidence at determined intervals, a fixed hopper, a plurality of fixed liquid conduits so arranged that when said filter carrier is at rest material to be treated and wash liquors can be delivered to co-operating filters, and a ramp rail fixed in the path traversed by said filter carrier at a position in relation to the movement of the carrier lying beyond the position of the wash liquor conduits and so disposed that said pivoted arms holding said filter frames pass over and are raised by said ramp rail to enable filter cakes to be removed from said filters under raised frames.

4. Apparatus as claimed in claim 3, wherein the filter frames are of frusto-pyramidal shape to prevent the filter cakes rising with said filter frames.

5. Apparatus as claimed in claim 3, including a worm conveyor and brushes arranged at a position in the path traversed by the filters where the frames are in a raised position to remove filter cakes from the filter.

6. Apparatus as claimed in claim 3, wherein the filter carrier and the movable and fixed slidably co-operating surfaces of the carrier and the member carrying the conduit slots are circular and the filters are mounted radially round the carrier, while the slots on the movable and fixed plane surfaces are correspondingly arranged.

7. Apparatus for the removal of liquids from masses of material associated therewith, which comprises a carrier having a slidably movable plane surface with slots therein, a series of box filters mounted on said carrier above said slots, each of said filters comprising a horizontal filter surface, a frame normally resting on said horizontal filter surface and a chamber below said filter surface to collect liquid passing through said filter, said chamber having outlets communicating with said slots in said carrier surface, a member having a fixed plane surface with slots which coincide at regular intervals with the slots in said carrier surface, a series of conduits communicating with said slots in a fixed plane surface, mechanism for moving said plane surface of said carrier slidably in contact with said fixed plane surface of said member at intermittent intervals, whereby said slots in the said contacting surfaces are brought into coincidence at determined intervals, and a hopper provided with a wide opening and a ball valve closing the said opening, said ball valve being operated intermittently by the mechanism achieving the intermittent movement of the filter carrier whereby a determined amount of the material to be treated can be discharged quickly on to the filter surface while the carrier is at rest.

8. Apparatus as claimed in claim 3, which includes a hopper provided with a wide opening and a ball valve closing the said opening, said ball valve being operated intermittently by the mechanism achieving the intermittent movement of the filter carrier whereby a determined amount of the masses of material to be treated can be discharged quickly on to the filter surface while the carrier is at rest.

9. Apparatus for the removal of liquids from masses of material associated therewith, which comprises a carrier having a slidably movable plane surface with slots therein, a series of box filters mounted on said carrier above said slots, each of said filters comprising a horizontal filter surface, a frame normally resting on said horizontal filter surface and a chamber below said filter surface to collect liquid passing through said filter, said chamber having outlets communicating with said slots in said carrier surface, a member having a fixed plane surface with slots which coincide at regular intervals with the slots in said carrier surface, a series of conduits communicating with said slots in a fixed plane surface, mechanism for moving said plane surface of said carrier slidably in contact with said fixed plane surface of said member at intermittent intervals, whereby said slots in the said contacting surfaces are brought into coincidence at determined intervals, and a fixed hopper containing material to be treated and arranged to deliver said material to said filter surfaces in succession, a plurality of conduits arranged in turn to spray each of said filter batches, and means for controlling said conduits from the mechanism which achieves the intermittent movement of said filter carrier, so that said conduits are caused automatically to discharge upon said filter batches at predetermined intervals.

10. Apparatus as claimed in claim 3, which includes a fixed hopper containing masses of material to be treated and arranged to deliver said material to said filter surfaces in succession, a plurality of conduits arranged in turn, to spray each of said filter batches, and means for controlling said conduits from the mechanism which achieves the intermittent movement of said filter carrier, so that said conduits are caused automatically to discharge upon said filter batches at predetermined intervals.

11. Apparatus for the removal of liquids from masses of material associated therewith which comprises a carrier having a slidably movable surface with slots therein, a series of box filters mounted on said carrier above said slots to receive the masses of material, each of said filters comprising a horizontal filter surface upon which a mass of material is deposited, a pivoted arm, a frame carried by said arm and normally resting on a horizontal filter surface, means for lifting said frame from said horizontal filter surface at intermittent intervals, and a chamber below said filter surface to collect liquid passing through said filter, said chamber having outlets communicating with said slots in said carrier surface, a member having a fixed plane surface with slots which coincide at regular intervals with said slots in said carrier surface, a series of conduits communicating with said slots in said fixed plane surface, and mechanism for moving said carrier surface slidably in contact with said fixed plane surface at intermittent intervals, whereby the slots in said plane surfaces may be brought into coincidence at determined intervals.

12. Apparatus for the removal of liquids from masses of material associated therewith which comprises a carrier having a slidably movable surface with slots therein, a series of box filters mounted on said carrier above said slots to receive the masses of material, each of said filters comprising a horizontal filter surface upon which a mass of material is deposited, a pivoted arm, a frame carried by said arm and normally resting on a horizontal filter surface, and means for automatically swinging said arm about its pivot to raise and lower said frame, a chamber below said filter surface to collect liquid passing through said filter, said chamber having outlets communicating with said slots in said carrier surface, a member having a fixed plane surface with slots which coincide at regular intervals with said slots in said carrier surface, a series of conduits communicating with said slots in said fixed plane surface, and mechanism for moving said carrier surface slidably in contact with said fixed plane surface at intermittent intervals, whereby the slots in said plane surfaces may be brought into coincidence at determined intervals.

13. Apparatus as claimed in claim 1, wherein the filter frames are of frusto-pyramidal shape to prevent the filter cakes rising with said filter frame.

14. Apparatus as claimed in claim 12, wherein the filter frames are of frusto-pyramidal shape to prevent the filter cakes rising with said filter frame.

JOHANN HELLE.
ALFONS KUNZ.